(12) United States Patent
Kim

(10) Patent No.: US 9,845,024 B2
(45) Date of Patent: Dec. 19, 2017

(54) GANTRY TYPE MOVABLE CATENARY SYSTEM AT A RAILWAY CROSSING

(71) Applicant: Yeon Won Kim, Cheonan-si (KR)

(72) Inventor: Yeon Won Kim, Cheonan-si (KR)

( * ) Notice: Subject to any disclaimer, the term of this patent is extended or adjusted under 35 U.S.C. 154(b) by 232 days.

(21) Appl. No.: 14/840,016

(22) Filed: Aug. 30, 2015

(65) Prior Publication Data

US 2016/0075258 A1 Mar. 17, 2016

(30) Foreign Application Priority Data

Sep. 12, 2014 (KR) .......................... 10-2014-0121137

(51) Int. Cl.
*B60M 1/04* (2006.01)
*B60M 1/20* (2006.01)
*B61L 29/00* (2006.01)

(52) U.S. Cl.
CPC ................ *B60M 1/04* (2013.01); *B60M 1/20* (2013.01); *B61L 29/00* (2013.01)

(58) Field of Classification Search
CPC . B60M 1/00; B60M 1/02; B60M 1/04; B60M 1/12; B60M 1/13; B60M 1/14
See application file for complete search history.

(56) References Cited

FOREIGN PATENT DOCUMENTS

| JP | H10-278636 A | 10/1998 | | |
|---|---|---|---|---|
| JP | 3187115 U | 11/2013 | | |
| KR | 10-2007-0053841 | * | 5/2007 | .............. B60L 5/12 |
| KR | 10-2007-0053841 A | | 5/2007 | |
| KR | 10-0728467 B1 | | 6/2007 | |
| KR | 10-0940767 B1 | | 2/2010 | |
| KR | 10-0977745 B1 | | 8/2010 | |

* cited by examiner

*Primary Examiner* — Robert J McCarry, Jr.
(74) *Attorney, Agent, or Firm* — KORUS Patent, LLC; Seong Il Jeong

(57) ABSTRACT

The present invention provides a gantry type movable catenary system at railway crossing having a simple and reliable structure, which can be applied to a conventional railway crossing as well as to a new railway crossing, and at the same time is improved such that service and maintenance are easy. The gantry type movable catenary system according to the present invention comprises: a pair of auxiliary rails 110 with a fixed length installed in parallel with railway rails 10 from the right and left outsides of the railway rails at the crossing; a frame structure of which a lower end is installed on the auxiliary rail, the frame structure being connected with a drive motor 130 to be reciprocally movable on the auxiliary rail; a movable contact wire 160 with a certain length connected via an insulator 152 on top of the frame structure and installed to parallel to a catenary wire 20; and a control unit which controls driving of the drive motor to operate the positioning of the frame structure, wherein, from a first power connecting section 21 of the catenary wire 20, a second power connecting section 161 of the both ends of the movable contact wire 160 is connected or disconnected depending on reciprocal movement of the frame structure, thus supplying or disconnecting electric power.

10 Claims, 9 Drawing Sheets

GANTRY TYPE MOVABLE CATENARY SYSTEM AT A RAILWAY CROSSING

CROSS-REFERENCE TO RELATED APPLICATION(S)

This application claims the benefit of Korean Patent Application No. 10-2014-0121137, filed on Sep. 12, 2014, the disclosure of which is hereby incorporated by reference herein in its entirety.

BACKGROUND

1. Technical Field

The present invention relates to a catenary system for supplying electricity for the operation of electric locomotives. In particular, the present invention relates to a gantry type movable catenary system which is installed in a railway crossing section to supply electricity for the operation of electric) locomotives, provides connection and disconnection of the catenary or overhead electric wire, and is configured to move reciprocally in lateral directions (along the rail) of the crossing to allow movement of over-height heavy transport vehicles and special motor vehicles and the like or the passing of other electric locomotives.

2. Description of the Related Art

Touted as the new means for transportation of the 21st century, the electric railway introduced alongside the high-speed railway has been further developed to have a speeding-up of services, increased capacity and shortened interval between operations, that have collectively resulted in a mass transit service which requires a catenary system for further improvements in performance, reliability and security.

In general, the term "catenary system" refers to a system for supplying electric power through contact with the current collector of electric locomotives. In other words, the required electric power for the operation of the electric locomotive is supplied from a constructed catenary to a current collector such as a locomotive pantograph. The catenary system for supplying electricity to the electric locomotive is classified according to the method of supplying the electricity. The overhead-wire catenary system is configured in a variety of ways depending on the conditions of the overhead train line.

Overhead-wire catenary systems are classified into an overhead catenary system, a rigid catenary system and a third rail system. In addition, the suspension system includes a direct suspension system and a catenary suspension system. The catenary suspension system includes the following systems:

1) Simple catenary system: This is a system constituted of a set of a messenger wire and a contact wire and configured such that the contact wire is parallel to the the orbital plane via the messenger wire.

2) Stitched Y-line simple catenary system: This is a system in which an electric wire of approximately 15 cm (called as a Y-line) is installed in parallel with the messenger wire in the vicinity of the support point of the simple catenary suspension system to which the catenary system is suspended.

3) Twin simple catenary system: This is a system developed so as to increase speed and collection performance without changing the system height of a conventional simple catenary section and configured such that two sets of system height contact lines are installed in parallel at regular intervals (100 mm is standard).

4) Heavy simple catenary system: This is a system in which the tension of electric wire is enlarged in the messenger wire of the simple catenary system.

5) compound catenary system: This is a system configured so as to install an auxiliary messenger wire in the messenger wire and the contact wire of the simple catenary system, suspend the auxiliary messenger wire as a dropper from the messenger wire, and suspend the contact wire in the auxiliary messenger wire with the hanger.

6) Synthetic compound catenary system: This is a system which uses a synthetic element combining a spring with an air damper to a dropper of the compound catenary system.

7) Heavy compound catenary system: This is a system in which the thickness and tension of the contact wire of the compound catenary system are greatly enlarged.

As described above, all the suspension systems of the contact wires conventionally used in the art are structured as a fixed system. Such a system of contact wires can select a suspension system in accordance with characteristics such as a traveling speed, capacity for collection of current and transport capacity when the electric locomotive is traveling. These fixed suspension systems have no problem functioning with general rail-travel by the electric locomotives, but in the case where they cross sections of general roads and railroads, the passage height is limited and the crossing of over-height heavy transport vehicles or special motor vehicles becomes impossible, thereby lowering the utilization of the road. Further, if the contact wire section uses an extra high voltage of AC 25 kV or DC 1500V, there was a problem that this can cause a safety-related accident such as an electric shock.

Regarding a movable catenary system applicable to the crossing section as mentioned above, the present inventors have suggested a movable catenary system at a railway crossings as disclosed in Korean Patent No. 10-0728467 (Patent Document 1), which comprises: a first and a second support structures which are installed on the left and right sides of the crossing and which are constructed such that a plurality of horizontal steel pipe columns and a plurality of vertical steel pipe columns are assembled; a first and a second outer booms installed on the first and the second support structures; a first and a second inner booms which are interconnected by moving close to each other while being supported on the first and the second outer booms, or are temporarily removed from the crossing by moving away from each other while being supported on the first and the second outer booms; a first and a second movable electric catenary sections which are installed on the lower portions of the first and the second inner booms to move together With the first and the second inner booms, and connected with the current collector of an electric locomotive to supply electric power; a first and a second driving sections which are connected with the first and the second inner booms to move the first and the second inner booms; and a control section which controls the first and the second driving sections according to the presence or absence of the electric locomotive in proximity to the crossing section to operate the first and the second inner booms.

However, since the structure as suggested in Patent Document 1 is a structure in which the support structure of the movable contact line is driven in a state being erected in the air (overhead wire structure), it is very difficult to apply to the operation of a conventional railway crossing. Moreover, the construction period is excessively long and the construction cost is high, and further the durability is low. Further, service and maintenance are difficult and there remains the risk of safety-related accident.

[Prior Art Document]
(Patent Document 1) 1. Korean Patent No. 10-0728467 (published on Jun. 13, 2007)

SUMMARY

Accordingly, the present invention has been made keeping in mind the above problems encountered in the prior arts, and an object of the present invention is to provide a gantry type movable catenary system at a railway crossing having a simple and reliable structure, which is capable of quickly and easily applying even to a conventional railway crossing as well as to a new railway crossing, and, at the same time, which is improved such that service and maintenance are easy.

In order to accomplish the above described object, the gantry type movable catenary system at a railway crossing according to the present invention comprises: a pan of auxiliary rails with a fixed length installed in parallel with railway rails from the right and left outsides of the railway rails at the crossing; a frame structure of which a lower end is installed on the auxiliary rail, and the frame structure being connected with a drive motor to be reciprocally movable on the auxiliary rail; a movable contact wire with a certain length connected via an insulator on top of the frame structure and installed in parallel to a catenary wire: and a control unit which controls driving of the drive motor to operate the positioning of the frame structure, wherein, from a first power connecting section of the catenary wire, a second power connecting section of the both ends of the movable contact wire is connected or disconnected depending on the reciprocal movement of the frame structure, thus supplying or disconnecting electric power.

According to the present invention, the support structure of the movable contact wire is a structure driven and supported on the ground, the structure is relatively simple, and therefore it can be reliably operated and the construction period can be shortened. Therefore, construction costs can be reduced, service and maintenance are easy and further safety-related accident can be prevented.

In addition, it is easy to apply to a new railway crossing. If the section insulator and disconnector are installed on the vertical and horizontal wires, a power interrupting construction can be partially made during the construction of the movable contact wire. Therefore, it is possible to easily apply even to a conventional railway crossing.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
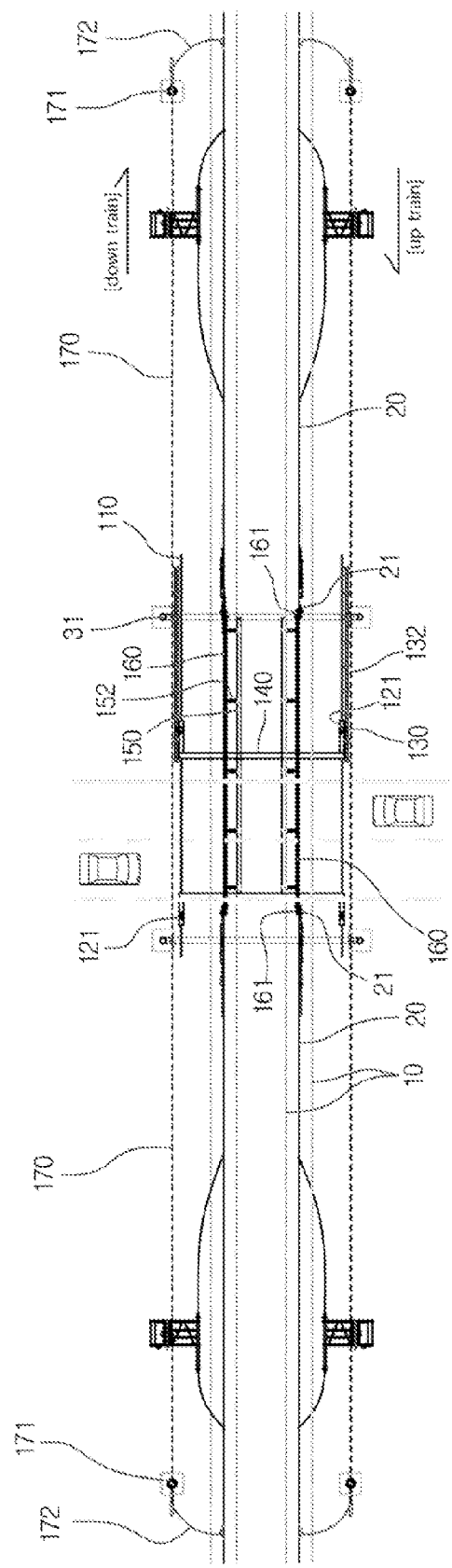
FIG. 1 is a schematic view showing the movable catenary system at a railway crossing according to the present invention.

Reference now should be made to the drawings, throughout which the sane reference numerals are used to designate the same or similar components.

Since various modifications can be made to various embodiments of the present invention, hereinafter, the structure of a preferred form of the invention will be illustrated in the drawing, on the basis of which the invention will be described in detail. However, the invention is not intended to be limited to the illustrated form, and the spirit and scope of the present invention include conventional changes, equivalents, and substitutions of the illustrated form.

Figure 2:
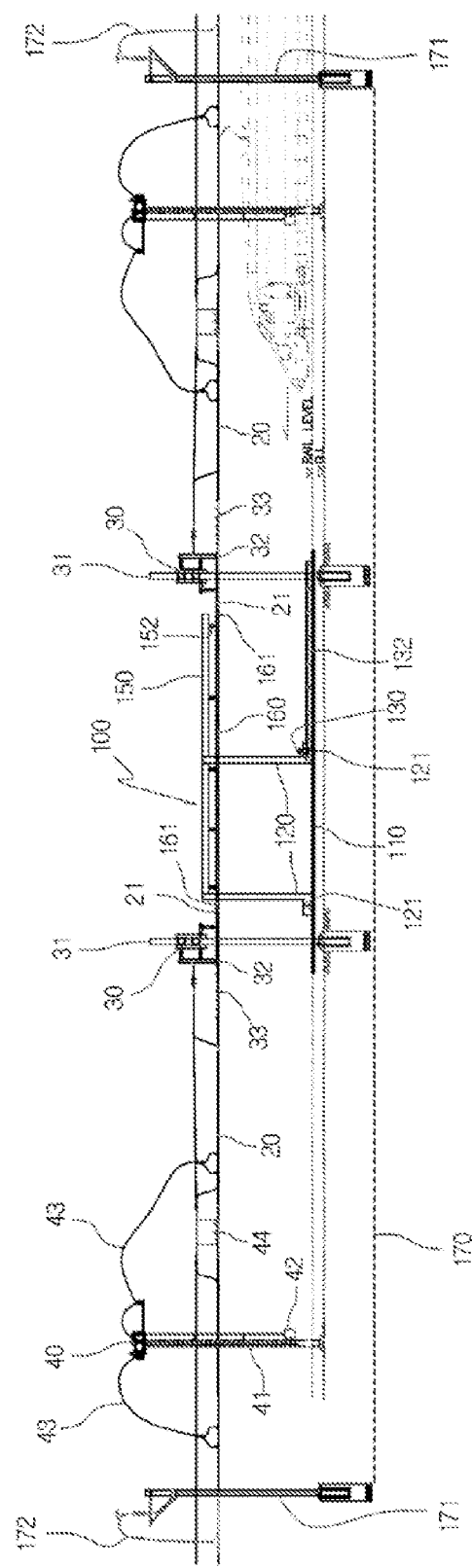
FIG. 2 is a schematic side view showing the movable catenary system at a railway crossing according to the present invention.
Figure 3:
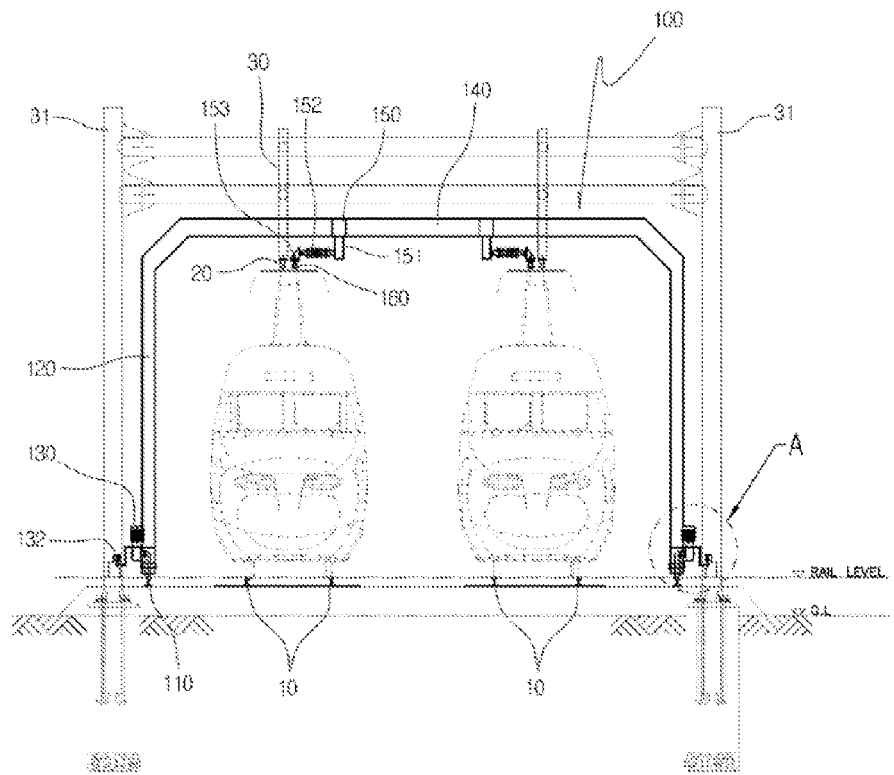
FIG. 3 is a schematic front view showing the movable catenary system at a railway crossing according to the present invention.
Figure 4:
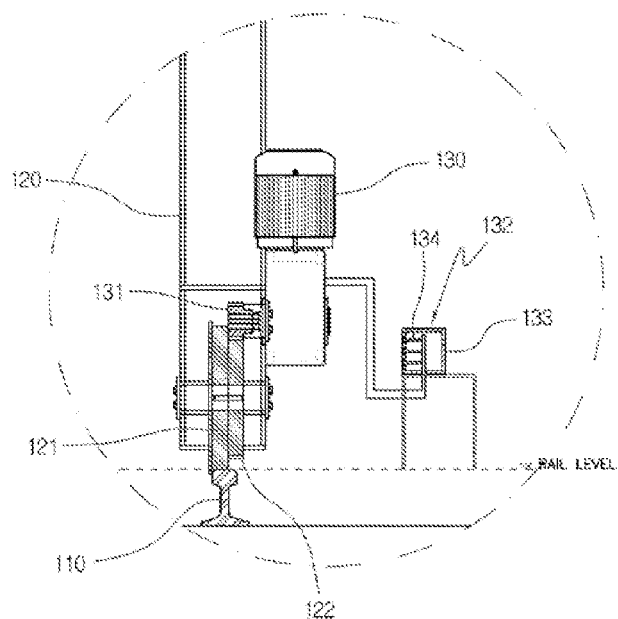
FIG. 4 is an enlarged view of the portion A of FIG. 3.
Figure 5:
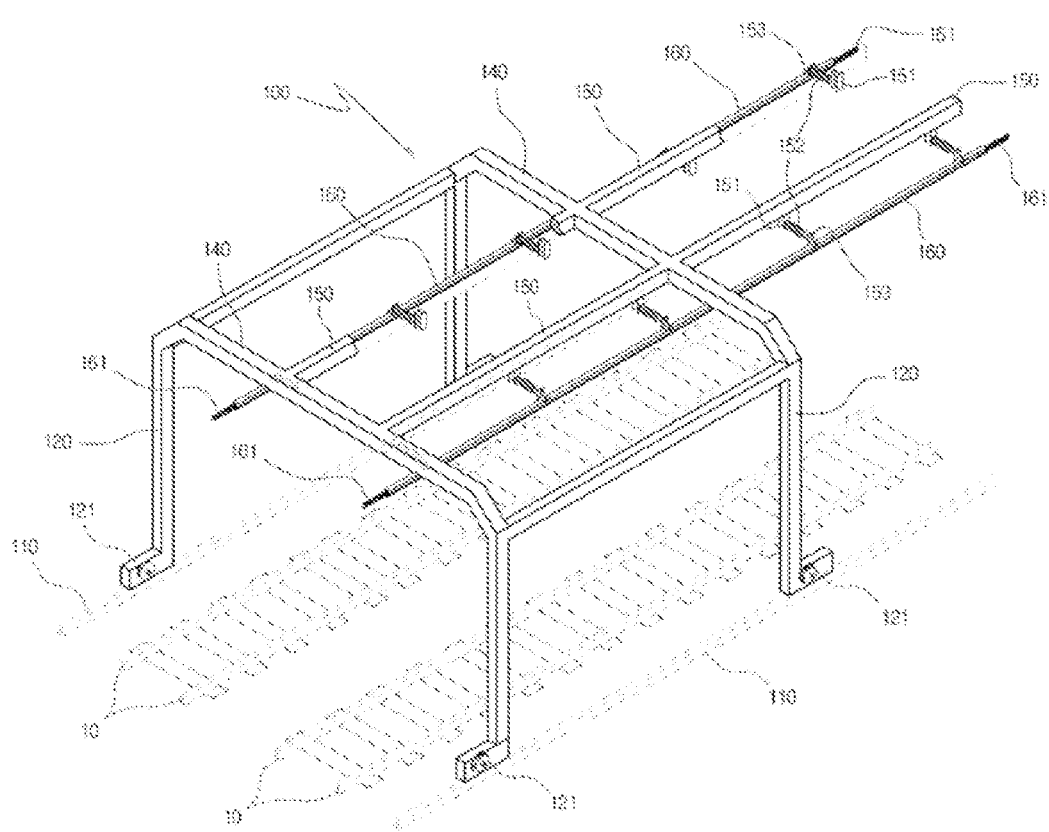
FIG. 5 is a perspective view showing the main portion of the movable catenary system at a railway crossing according to the present invention.
Figure 6:
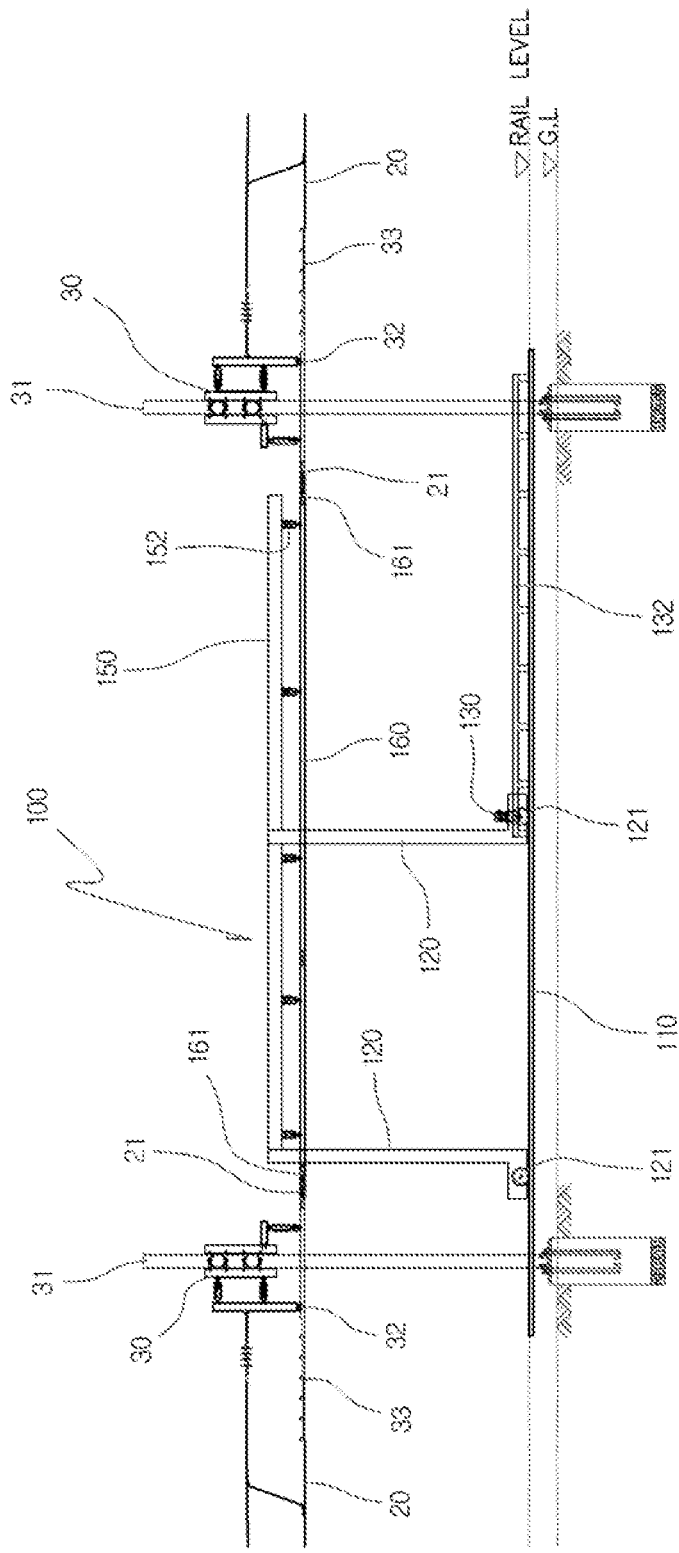
FIG. 6 is an enlarged view of the main portion of FIG. 1.
Figure 7:
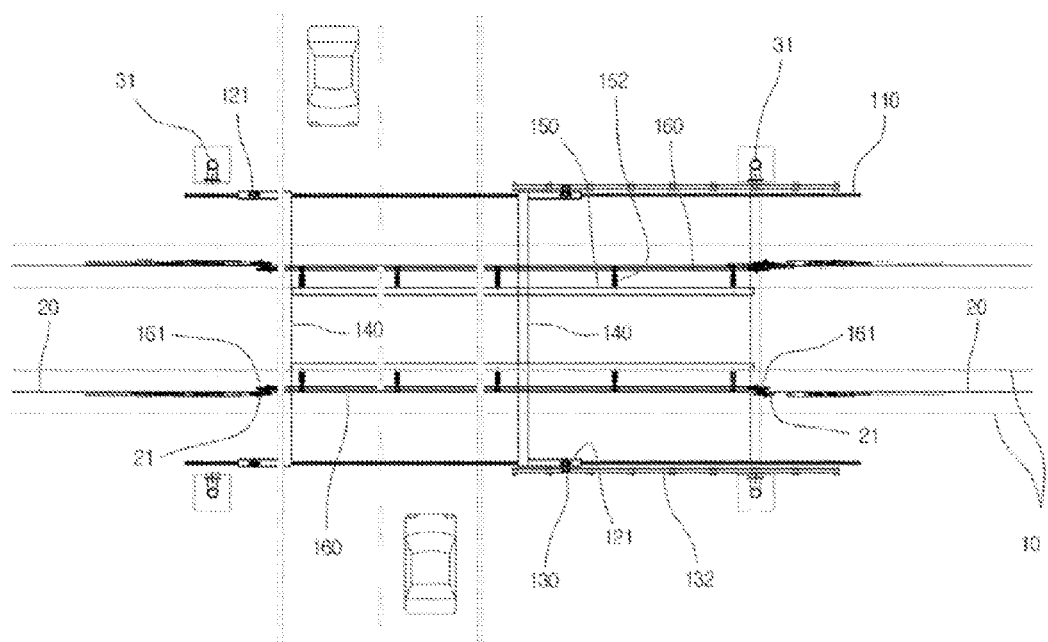
FIG. 7 is an enlarged view of the main portion of FIG. 2.
Figure 8:
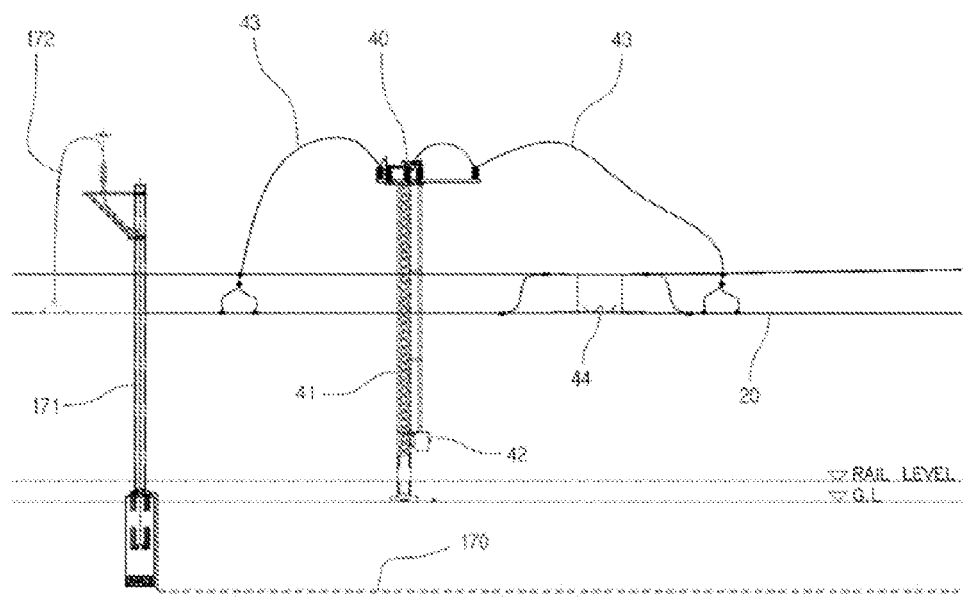
FIG. 8 is a partial enlarged view of a disconnecting switch in the movable catenary system at a railway crossing according to the present invention.

FIG. 1 is a schematic view showing the movable cat nary system at a railway crossing according to the present invention. FIG. 2 is a schematic side view showing the movable catenary system at a railway crossing according to the present invention. FIG. 3 is a schematic front view showing the movable catenary system at a railway crossing according to the present invention. FIG. 4 is an enlarged view of the portion A of FIG. 3. FIG. 5 is a perspective view showing the main portion of the movable catenary system at a railway crossing according to the present invention. FIG. 6 is an enlarged view of the main portion (portion of the movable contact line) of FIG. 1. FIG. 7 is an enlarged view of the main portion (portion of the movable contact line) of FIG. 2. FIG. 8 is a partial enlarged view of the interconnecting switch in the movable catenary system at a railway crossing according to the present invention.

Referring to FIGS. to 8, the gantry type movable catenary system at a railway crossing, according to the present invention is largely configured to include an auxiliary rail 110, a frame structure, a movable contact wire (rigid bar) 160, and a control unit (not shown).

The auxiliary rails 110 are installed in parallel to the railway rails 10 on the left and right outsides of the rails 10 that pass through the crossing. The auxiliary rail 110 has a predetermined, fixed length (the length of the section in which the frame structure is reciprocally movable) and one pair thereof is installed on the left and right outsides of the railway rail 10, respectively.

The frame structure is installed on the auxiliary all 110 at the lower end thereof and connected to the drive motor 130. Therefore, the reciprocal movement becomes possible on the auxiliary rail 110 by the driving of the drive motor 130.

More specifically, the frame structure consists of vertical frames 120, horizontal frames 140 and extension frames 150.

The vertical frame 120 is a frame having a predetermined length that is formed in the vertical direction. A wheel 121 is mounted in the lower end portion of the frame. The Wheel 121 is driven along the auxiliary rail 110 in a state being mounted on the auxiliary rail 110 an a way of being in contact with the upper surface).

As illustrated, there are two vertical flames 120 on each of the auxiliary rails 110 On both sides. Thus, the number of the vertical frames 120 can be a total of four. The number of the vertical frames 120 can increase depending on the size of the crossing and is not limited.

The horizontal frame 140 is to cross the railway mil on top or the both side vertical frames 120 to connect with and support the both side vertical frames 120 each other. The number of the frames can be appropriately changed depending on the size of the movable contact wire.

The extension frame 150 is formed to be extended from the horizontal frame 140 by a certain length in the same direction as the catenary wire 20. The extension frame 150 is provided to fix a movable contact wire 160.

The drive motor 130 for driving the frame structure can he fixed to a lower side of the vertical frame 120. A wheel gear 122 is configured in the outer periphery of the wheel 121, and a pinion gear 111 connected to and driven by the drive motor 130 is fitted with the wheel gear 122.

On one side of the auxiliary rail 110, the rigid trolley bar 132 is installed in parallel with the auxiliary rail 110 to supply electric power to the drive motor 130, and the rigid trolley bar 132 is set to a length corresponding to the movement section of the drive motor 132.

More specifically, the rigid trolley bar 132 is configured to include a protective case 133 in which the upper end and both side walls of the traverse cross section are closed and the lower end is open; and a current collector 133 which is disposed in the inner space of the protective case 133 and which can supply electric power to the drive motor 130 by electric contact with the trolley wire within the protective case 133.

The current collector 134 is installed such that it is connected to the drive motor 130 via an electric connector 135 and at the same time associated with the drive motor 130 to be reciprocally movable within the protective case 133. Meanwhile, the current collector 134 is in electrical contact with the trolley wire (electric supply wire) installed in the entire section in the longitudinal direction within the protective case 133.

Therefore, although the current collector 134 is moved in conjunction with the drive motor 130, it is continuously in contact with the trolley wire and thus it is possible to continuously supply electric power to the drive motor 130 irrespective of the change in the position.

The current collector 134 and the trolley wire electrically in contact with the collector are configured such that the upper end and the side wall are installed within the closed protective case 133, which can provide protection from rain or snow. The electric connector 135 connected to the current collector 134 and the drive motor 130 is connected via an open lower end of the protective case 135.

Thereby, when supplying electricity by as trolley wire to drive the drive motor 130, the electric power is supplied, to the drive motor 130 via the current collector 134 and the electric connector 135 which are in contact with the trolley wire.

When the pinion gear 131 is driven by a forward or reverse rotation by applying electric power to a pinion gear 131, the driving power is transmitted to a wheel gear 122 via the pinion gear 131, and the wheel 121 formed together with the wheal gear 122 is rotated in a forward or reverse direction. Thus, the frame structure can be reciprocally moved on the auxiliary rails 110.

The movable contact wire 160 has a length which can cross at least the entire section of the crossing. This is connected to the top of the frame structure, mote particularly, to the extension frame 150, via an insulator 152 and further installed in parallel to the catenary wire 20.

The insulator 152 is configured such that one end thereof is connected to the top of the frame structure via a support post 151 in the vertical direction, that is, to the extension frame 150, and the other end is connected with the movable contact wire 160 via a bracket 153. A plurality of insulators 152 can be installed between the extension frame 150 and the movable contact wire 160.

The control unit (not shown) automatically controls the driving of the drive motor 130 to move the frame structure. Thereby, the movable contact wire 160 enters into the crossing or exits from the crossing.

Thus, if the frame structure is reciprocally moved on the auxiliary rails 110, the second power connection portion 161 of the two side end of the movable contact wire 160 is connected to Or separated from the first power connecting portion 21 of the end portion of the catenary wire 20.

The movable catenary system 100 is normally installed across the crossing, and typical vehicles pass between the frame structures of an "Π" shape.

When the movable catenary system is located at the crossing, the second power connecting section 161 of the movable contact wire 160 and the first power connecting section 21 of the catenary wire 20 are interconnected or connected and the electric power supply to the moving contact wire become possible. Thus, the electric locomotive can pass through the crossing.

If over-height heavy transport vehicles loaded with cargo or special motor vehicles with the height over the catenary wire try to pass through the railroad crossing, the mo able catenary system 100 can he operated in advance so as to exit from the crossing in accordance with the permission or control of the railway traffic control, etc.

Of course, before and during the movement of the movable catenary system 100 vehicle traffic must be controlled by operating a blocking device (not shown) already installed at the crossing for prevention of safety-related accident.

The catenary wire 20 is disposed opposite to each other between the roads, and a fist power connecting section 21 is provided at the end of the respective catenary wire 20 disposed opposite.

In a preferred embodiment, as shown in FIG. 6, the first power connecting section 21 is connected to the catenary wire 20 via the transition 31. The transition 31 is suspended by a straining device 30 installed on a straining steel pole 31 with a straining point support clamp 32.

The straining device 30 can fix one side of the straining interval to suppress movement of the catenary wire and at the same time control the tension. The transition 31 is a device wherein a pantograph of an electric locomotive smoothly contacts and passes in a moiety that the catenary wire 20 and the first power connecting section 21 are converted.

On the other hand, it is necessary to block electric power supply circuit supplied to the crossing region before the operation of the movable catenary system 100. Therefore, as shown in FIG. 8, in the region of the movable catenary system 100, a disconnecting switch 40 and a section insulator 44 are installed at a predetermined position.

That is, the catenary wire 20 is connected to a disconnecting switch 40 on the disconnecting switch steel pole 41 via a feeder wire 43. Therefore, it is possible to supply or block electric power to the first power connecting portion 21 by controlling the disconnecting switch 40, wherein the disconnecting switch 40 can be automatically controlled by connecting to the motorized disconnecting switch control box 42.

If the catenary system 100 exits from the crossing section, the respective catenary wires 20 disposed opposite to the outsides of the crossing section are disconnected from each other. At this time, each of the catenary wires 20 must be electrically powered so that the electric locomotive between the two substations on both sides of the crossing can be running.

To this end, the respective catenary wires 20 disposed opposite to the outsides of the crossing section is interconnected with a main feeder line 172 installed on a main feeder line steel pole 171, and the main feeder lines 172 on both sides should always be powered with each other by a regular main feeder line cable 170.

At this time, the regular main feeder line cable 170 connecting between the main feeder line steel poles 171 on both sides can be buried underground so that the passage of the vehicle cannot be disturbed due to the regular main feeder line cable 170.

With this configuration, the both side catenary wires 20 disconnected at the overhead catenary wire of the crossing section is connected with each other by the regular main feeder line cable 170. Therefore, the catenary wire 20 can be regularly powered irrespective of the position (the position that is located at the crossing or apart from the crossing) of the movable catenary system 100.

Figure 9:
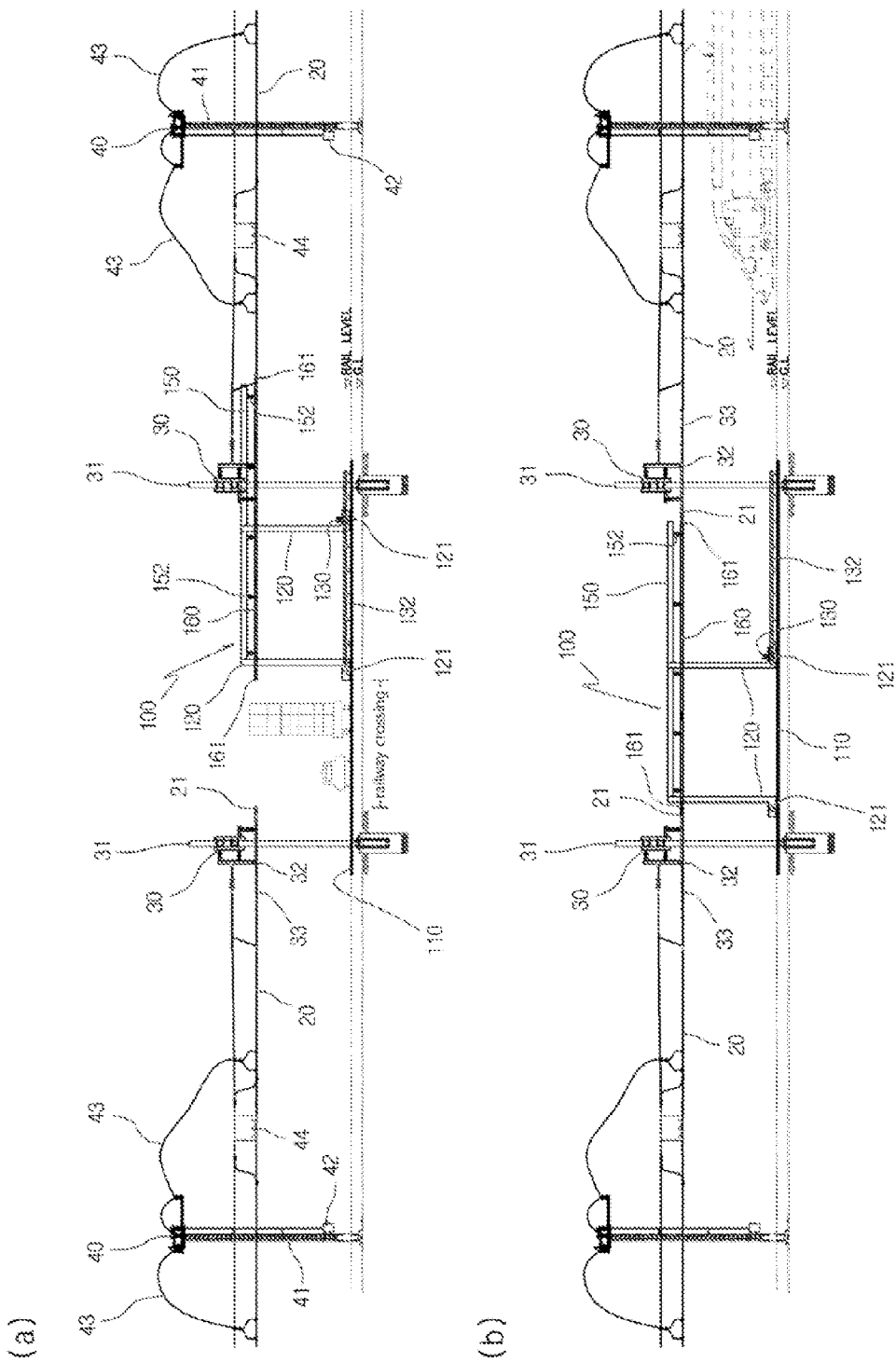
FIG. 9 is a diagram showing the operation of the movable catenary system at a railway crossing according to the present invention. (a) of FIG. 9 is an open state of the crossing, and (b) of FIG. 9 is a closed state of the crossing.
Figure 10:
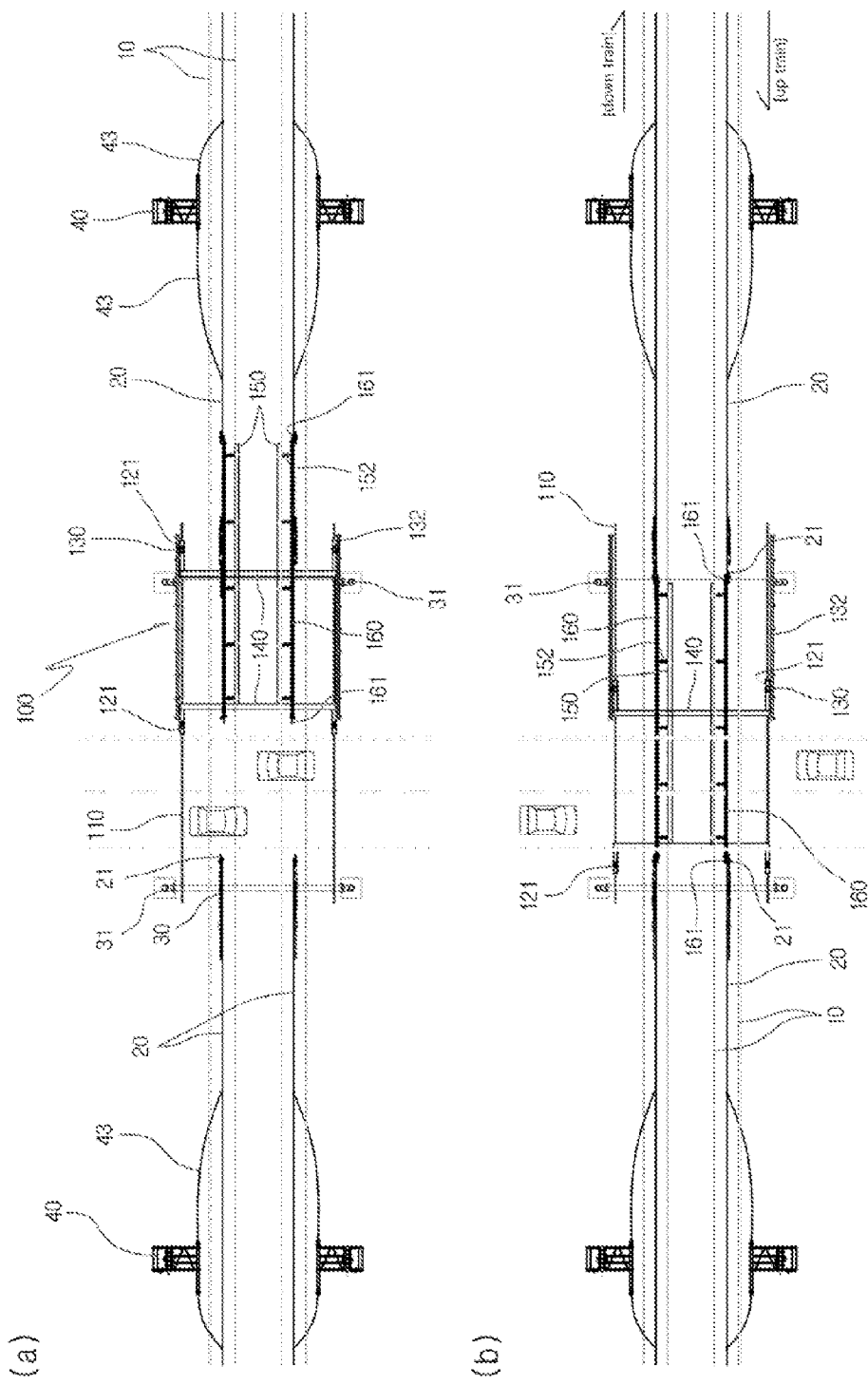
FIG. 10 is a plane view showing the use state operation of the movable catenary system at a railway crossing according to the present invention. (a) of FIG. 10 is an open state of the crossing, and (b) of FIG. 10 is a closed state of the crossing.

FIG. 9 is a side view showing the use state of the movable catenary system at as railway crossing according to the present invention. (a) shows an open state of the crossing, and (b) shows a closed state of the crossing. FIG. 10 is a plane view showing the use stale of the movable catenary system at as railway crossing according to the present invention. (a) of FIG. 10 shows an open state of the crossing, and (b) of FIG. 10 shows a closed state of the crossing. The present invention will he more detailed through the description of the operation of FIG. 9 and FIG. 10.

Referring to (a) of FIG. 9 and (a) of FIG. 10, the movable catenary system 100 is located at the position apart from the crossing where the vehicle passes, whereby the movable contact wire 160 exits from the crossing and thus any scaffolding including a catenary wire is removed on the road of the crossing. Therefore, the heavy transport vehicles and special motor vehicles can safely pass through the crossing regardless of the height.

Referring to (b) of FIG. 9 and (b) of FIG. 10, when the movable catenary system 100 attempts to enter into the crossing for the passage of typical vehicles and electric locomotives, the drive motor 130 is operated by a control unit (not shown) and the driving force of the drive motor 130 is transferred to the wheel 121 of the vertical frame 120. Thus, the frame structure enters into the crossing along the auxiliary rails 110. (Here, the electric feeder structure of the drive motor 130 and the driving force transmission system of the wheel 121 ate already described previously, the specific description thereof will be omitted).

The movable contact wire 160 moves to the top of the crossing in conjunction with the positioning of the frame structure. The second power connecting portion 161 of the contact wire 160 is connected to the fin E power connecting portion 21 of the catenary wire 20, whereby the catenary wire 20 disposed opposite to each other can be interconnected or powered via the movable contact wire 160, thus supplying power to the electric locomotive that passes through the crossing.

The above description has been given based on the limited embodiment showing the technical idea of the present invention, but the present invention is not intended to be limited to a certain example or numerical number. Various changes including changing or mixing some components of the embodiments can be made by a person skilled in the art without deviating from the gist of the present invention which is defined in the claims and that such change should not be understood to be separate from the technical sprit or the prospect of the present invention.

What is claimed is:

1. A gantry type movable catenary system at a railway crossing comprising:
   a pair of auxiliary rails with a fixed length installed in parallel with railway rails from the right and left outsides of the railway rails at the crossing;
   a frame structure of which a lower end is installed on the auxiliary rail, the frame structure being connected with a drive motor to be reciprocally movable on the auxiliary rail;
   a movable contact wire with a certain length connected via an insulator on top of the frame structure and installed in parallel to a catenary wire; and
   a control unit which controls driving of the drive motor to operate the positioning of the frame structure,
   wherein, from a first power connecting section of the catenary wire, a second power connecting section of the both ends of the movable contact wire is connected or disconnected depending on reciprocal movement of the frame structure, thus supplying or disconnecting electric power, and
   wherein the first power connecting portion is connected with the contact wire via a transition device and the transition device is connected and fixed to a straining device installed on a straining tower through a straining point support clamp.

2. The gantry type movable catenary system at a railway crossing of claim 1, wherein the frame structure includes a plurality of vertical frames each of which is installed with a wheel to drive along the auxiliary rails; a horizontal frame which crosses the railway rail on top of the vertical frames to connect the vertical frames on both sides; and an extension frame extended in the same direction as the contact wire from the horizontal frame to fix the movable contact wire.

3. The gantry type movable catenary system at a railway crossing of claim 2, wherein a wheel gear is configured in the outer periphery of the wheel, and the drive motor is fixed to the vertical frame, and a drive gear connected to the drive motor is fitted with the wheel gear to allow transmission of power.

4. The gantry type movable catenary system at a railway crossing of claim 3, further comprising a rigid trolley bar of a predetermined length, which is installed in parallel with the auxiliary rail, and which is set to supply electric power to the drive motor through a current collector.

5. The gantry type movable catenary system at a railway crossing of claim 4, wherein the rigid trolley bar is configured to include a protective case in which the upper end and both side walls of the cross section are closed and the lower end is open; and a current collector which is disposed in the inner space of the protective case and which can supply electric power to the drive motor by electric contact with the trolley wire within the protective case.

6. The gantry type movable catenary system at a railway crossing of claim 5, wherein the current collector is connected with the drive motor via an electric connector and, at the same time, associated with the drive motor to be reciprocally movable within the protective case, and the electric connector is connected through the open lower end of the protective case.

7. The gantry type movable catenary system at a railway crossing of claim 1, wherein the insulator is configured such that one end thereof is connected to the top of the frame structure via a support post and the other end is connected with the movable contact wire via a bracket.

8. The gantry type movable catenary system at a a railway crossing of claim 1, wherein the catenary wire is connected to a disconnecting switch on the disconnecting switch steel pole via a feeder wire.

9. The gantry type movable catenary system at a railway crossing of claim 1, wherein the respective catenary wires disposed opposite to each other on the outsides of the crossing section are connected to a main feeder line installed on a main feeder line steel pole, and the main feeder lines on both sides are connected to be powered with each other by a regular feeder line cable.

10. The gantry type movable catenary system at a railway crossing of claim 9, wherein the regular feeder line cable connecting between the main feeder line steel poles on both sides of the crossing section is buried underground.

* * * * *